(12) United States Patent
Romero De La Mora (10) Patent No.: US 9,533,435 B2
(45) Date of Patent: Jan. 3, 2017

(54) ROTATIONAL MOLDING METHOD AND APPARATUS

(75) Inventor: Mario Antonio Romero De La Mora, Colonia Lomas de Chapultepec (MX)

(73) Assignee: GRUPO ROTOPLAS, S.A. DE C.V., Colonia Lomas de Chapultepec (MX)

( * ) Notice: Subject to any disclaimer, the term of this patent is extended or adjusted under 35 U.S.C. 154(b) by 1011 days.

(21) Appl. No.: 13/580,907

(22) PCT Filed: Feb. 23, 2010

(86) PCT No.: PCT/IB2010/000336
§ 371 (c)(1),
(2), (4) Date: Oct. 15, 2012

(87) PCT Pub. No.: WO2011/104573
PCT Pub. Date: Sep. 1, 2011

(65) Prior Publication Data
US 2013/0026684 A1    Jan. 31, 2013

(51) Int. Cl.
| | |
|---|---|
| *B29C 41/04* | (2006.01) |
| *B29C 41/06* | (2006.01) |
| *B29C 41/08* | (2006.01) |
| *B29C 33/34* | (2006.01) |
| *B29C 41/36* | (2006.01) |

(52) U.S. Cl.
CPC ............... *B29C 41/06* (2013.01); *B29C 33/34* (2013.01); *B29C 41/04* (2013.01); *B29C 41/042* (2013.01); *B29C 41/08* (2013.01); *B29C 41/085* (2013.01); *B29C 41/36* (2013.01)

(58) Field of Classification Search
CPC .......... B29C 33/34; B29C 41/06; B29C 41/04; B29C 41/042; B29C 41/08; B29C 41/085
See application file for complete search history.

(56) References Cited

U.S. PATENT DOCUMENTS

| | | |
|---|---|---|
| 3,301,925 A | 1/1967 | Engel |
| 3,744,951 A | 7/1973 | Szatkowski |
| 4,043,721 A | 8/1977 | Lemelson |
| 4,097,572 A | 6/1978 | Walker |
| 4,247,279 A | 1/1981 | Masters |
| 4,632,654 A | 12/1986 | Lemelson |
| 4,687,531 A | 8/1987 | Potoczky |
| 6,709,619 B2 | 3/2004 | MacDonald |
| 2006/0088622 A1 | 4/2006 | Persico |

FOREIGN PATENT DOCUMENTS

| | | |
|---|---|---|
| WO | 2008/131555 A2 | 6/2008 |
| WO | 2008/133535 A1 | 11/2008 |

*Primary Examiner* — Robert J Grun
(74) *Attorney, Agent, or Firm* — Sughrue Mion, PLLC (57) ABSTRACT

The present invention refers to a process and apparatus for manufacturing plastic articles through the rotational molding method, and is more particularly addressed to a process and apparatus of rotomolding in furnace for manufacturing containers with multiple layers. The apparatus of the present invention uses a series of bins for the introduction of the materials to be molten on the molds, which are controlled by a computerized control panel.

24 Claims, 4 Drawing Sheets

ROTATIONAL MOLDING METHOD AND APPARATUS

FIELD OF THE INVENTION

The present invention refers to a process and apparatus for manufacturing plastic articles through the rotational molding method, and is more particularly addressed to a process and apparatus of rotomoulding in furnace for manufacturing containers with multiple layers.

BACKGROUND OF THE INVENTION

Rotational molding is a method for manufacturing hollow articles such as containers, from a thermoplastic material. The particles of said thermoplastic material in the form of liquid, powder or pellets, are provided within a hollow mold and the mold rotates in a heated environment until the thermoplastic material is molten within all the inner surface of the mold.

There are several kinds of machines, from the small and simple ones, to the ones with large rotation diameters with sophisticated controlling electric system. Its selection is made based on certain parameters to consider, as the size of piece, production rate, planned investment.

There are also different rotomoulding systems; the simplest known as stationary or quiescent to which the the mould carriers enter and come out; others with a central rotary unit or roundabout, with three, four or more arms that move among the different work stations (load, heating, cooling, load/unload). For pieces of large dimensions, the rotary looper-like machines are used.

The traditional rotomoulding process is made in open flame, with the disadvantage that the thickness of the walls of the resulting article is not homogeneous, as the heating of the mold is irregular. On the contrary, the processes of rotomoulding in furnace, allow the achievement of great quality articles, with homogeneous thickness walls. However, when it comes to manufacturing articles with multiple layers, the use of a furnace is impractical, as once the first layer is formed, the next load of material to be molten, generally implies the removal of the mold from the furnace. Alternatively, in order to avoid the removal of the mold from the furnace, a gate from the furnace is opened, and the thermoplastic material is introduced, either by means of a bin or box commonly named "drop-box", or by means of any spray device. Generally, the feeding stage, especially with the use of "drop-box", is commonly performed manually, and even in some cases, it comes necessary to suspend heating, as the material within the "drop-box" may be plastified before being poured into the mold. The above implies delays in the overall process, losses of heat from the furnace and thus, greater energy expenditure. The feeding stage becomes further limiting, when it comes to manufacturing several articles of several layers in a single cycle.

In the prior art there are several devices, which serve for introducing materials to the rotomoulding furnace. U.S. Pat. No. 4,687,531 from Potoczky, describes a device for layering structures with uniform walls that are made by rotation and heating in a mold, the mold being in an horizontal position, the device of the prior art, in order to achieve its objective, uses a device for introducing the material with a material sprinkler, which, by means of compressed air, spreads the material due to the use of an arm in the edge that is inserted into the mold, this arm may be moved at the horizontal axis and the part wherein the materials exit has a 90° movement, the mold is in a furnace which heats to a desired temperature. This device has the disadvantage that, at the moment of placing the material, there are some places wherein the provision of the material is not made, further, it requires involving a person that has the skills for handling the arm and providing the materials in a uniform manner, however, the device of the invention uses molds, which may be immediately reutilized for introducing the same material to the next mold, this is advantageous in a production line of more than one mold, further, in order to achieve the layering of two or more layers in the device of the prior art, it is necessary to provide another arm with any other material which, by the way, is not suggested in the same; finally, the arm has no cooling means, which eases the introduction of a different material for the layering of two or more layers.

U.S. Pat. No. 3,744,951 from Szatkowski, describes a system for manufacturing containers, the system is provided with a furnace with containers in a roundabout shape, has different stations in which the molds are passed through each layering stage, one station has an arm for introducing the material, the arm is introduced within the molds for spreading the material as a powder and then be removed to continue with the rotomoulding; although it is an arm that enters and exits the mold, has the disadvantage that the same is made by means of sprinklers, thus, a number of supporting elements are used; further, for moving the arm, such arm has to be moved with all the basement set, so the energy consumption is relevant; further, for the layering of two or more containers, it is necessary that each mold moves to the arm position, which entails to manufacturing a minor number of containers per time unit; when using a roundabout, it may only feed a single container, and for the accomplishment of two or more layers, it would be necessary to have two or more arms with material, which would increase the cost of production, as the arm may only use one single material. The disadvantage of this device is that its maintenance is higher, and that it may only introduce the material one at a time. The cleansing on each introduction is possible only once the line of production is stopped.

Publication No. WO 2008/133535, shows a furnace wherein molds of different shapes are introduced and in wherein the horizontal axis of the molds is rotated for manufacturing pieces; this device has a gate in which there is a window through which a tube is introduced, said tube, by means of pressure, spreads the powder of the material into the inner part; once the material contacts the heated mold, it forms the desired piece, however, this furnace only makes one single piece at a time, and there is no mention of the material being deposited and that such material, due to the rotation, is homogeneously distributed to the mold. The material is not only deposited within the mold, it is also blown, so that afterwards, by means of rotation, it may be distributed to the mold. The disadvantage of this device is that, for the achievement of two or more layers, it would be necessary to have an arm for each material, as such arm may not be cleaned at the moment of manufacturing the product, and it would be necessary to have two tubes for introducing the materials, increasing, at the same time, the production cost.

As a further alternative, U.S. Pat. No. 4,632,654 describes the use of a furnace for rotomoulding that is attached to a cooling chamber, wherein the molds are carried from the furnace to the cooling chamber and, once loaded with the second layer material, they are again directed to the furnace and later to the cooling chamber, and so on. This system is complex, as it requires a device for carrying the molds from one chamber to another, and the time of production is considerably elongated.

Until now, no process allows for the manufacturing of multilayer articles in furnace through an automated cycle, highly efficient, with great volumes of production and without energy losses, wherein the bins for the introduction of the material to the molds are used, and that those same bins may be used in the same production cycle for providing the forming material of the first layer to the molds; those same bins, once cleaned, are used for providing the next layer of material, and so on, until the the completion of the desired number of layers is achieved.

SUMMARY OF THE INVENTION

The process and apparatus of this invention may be used for manufacturing containers and other hollow articles from a thermoplastic resin material, that is capable of forming a film under the influence of heat. Examples of such materials are polyethylene or other polyolefins such as, e.g., polystyrene and PVC, or engineering plastics.

According to this invention, the thermoplastic material is directly deposited into one or more molds within the furnace with molding chamber. The proposed feeding system of this invention has a plurality of bins that are introduced through gates that are formed at the walls of the furnace, with no need for removing the molds of the molding chamber. The bins have a cooling system that prevents the thermoplastic material from being adhered to the surface of the bin, and also, they undergo a cleansing stage before performing the next load to the molds, which avoids the layer(s) from being polluted with material from the previous load.

Further, this invention provides a highly efficient automated feeding system, ideal for processes that involve several molds within the same production cycle. This system is based on the simultaneous feeding of two molds, by means of the introduction of two bins that contain the thermoplastic material into the furnace, then, the positioning of two other molds and the introduction of two other bins with material to be molten is carried out, and so on, until all the molds have the load of the thermoplastic material. Thereafter, the rotary movement of the molds within the molding chamber for forming a first layer is performed. Then, the feeding of the material that will form the second layer is performed, by means of the previously described feeding method, and the rotation of the molds for forming the second layer, and so on. It is important to mention that the furnace has a substantially constant temperature during the entire production cycle, which is an advantage with respect to the economical and energy aspects.

This invention constitutes an improvement to the prior art, as it allows for the manufacturing of multilayer products in a furnace with molding chamber, by means of a highly efficient process, with no delays at the feeding stage of the thermoplastic material, with no energy losses, achieving high quality articles and great production volumes in a short term, and that uses a series of bins for the introduction of the materials to be molten towards the molds, with no need to use spray or injection means for providing the thermoplastic material.

BRIEF DESCRIPTION OF THE DRAWINGS

FIGS. 5*a* and 5*b* are perspective views of one of the bins that carry the material to be molten into the furnace, the bin being coupled to a rotary arm; FIG. 5*a* shows the bin in the position for containing the material to be molten, and FIG. 5*b* shows the bin in the position for pouring its contents.

DETAILED DESCRIPTION OF THE INVENTION

Figure 1:
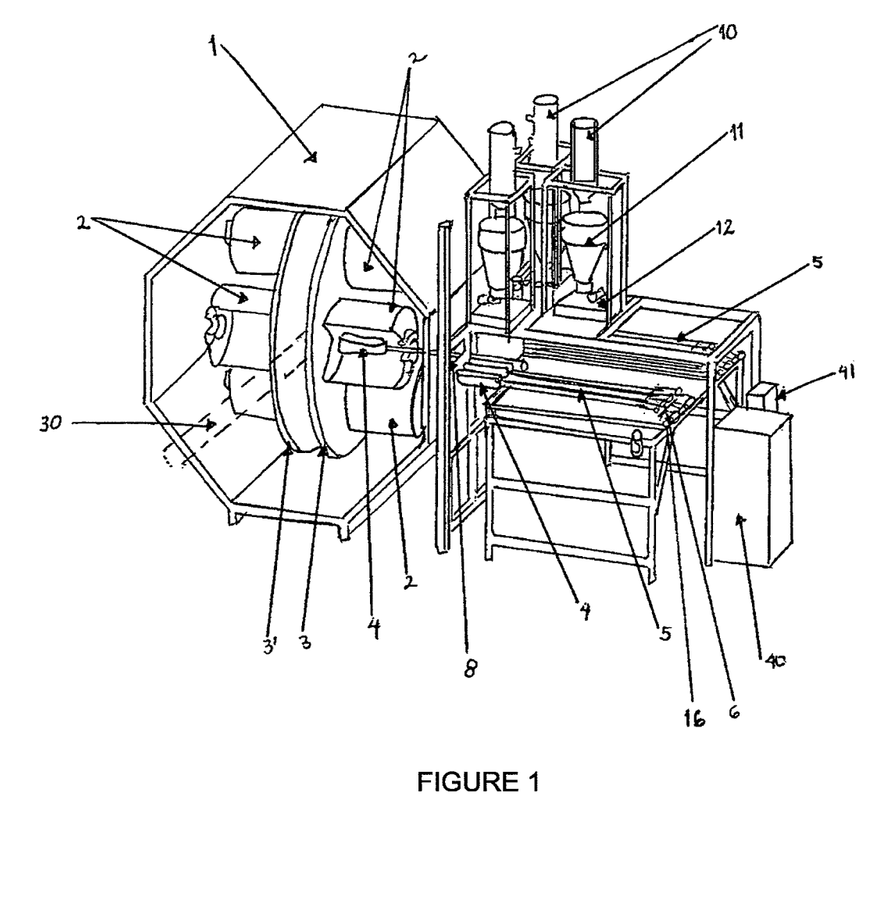
FIG. 1 is a perspective view of the rotomoulding apparatus of the present invention.

FIG. 1 shows a perspective view of the system of the present invention, which is comprised mainly by a furnace (1) with molding chamber and a feeding system for the thermoplastic material, adjacent to the furnace.

The furnace (1) is a thermally isolated structure, preferably, with steel plate panels. In the preferred embodiment, the furnace has an octagonal shape, as this arrangement allows for the achievement of a better heating efficiency. However, chambers of any other polygonal shape may be used, for example, hexagonal, or even cylindrical, spherical, cube shape chambers, or with the shape of any other parallelepiped.

The furnace (1) has heating means (not shown in the Figures) that rise enough the temperature of the chamber so as to laminate the thermoplastic material. The preferred heating means are selected from burners with methane or LP gas (liquefied propane gas), digital burners, per electric arc, among others.

Figure 3:
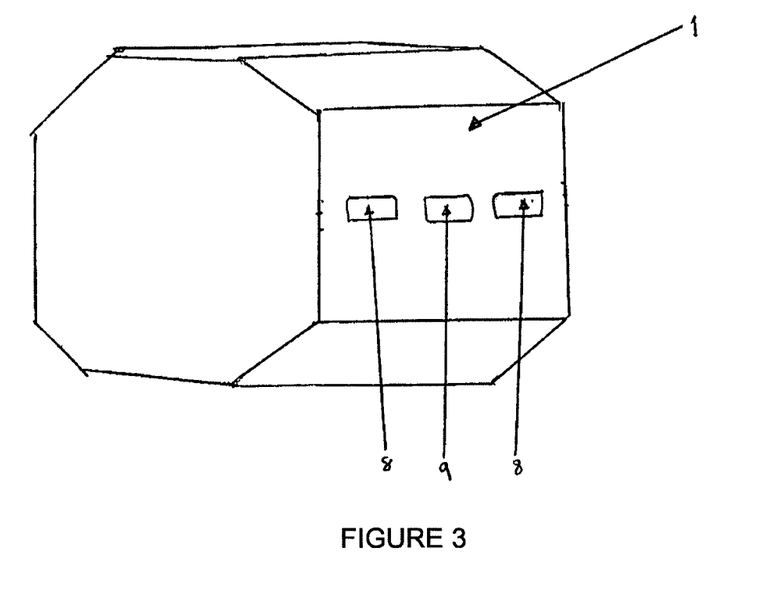
FIG. 3 is a perspective view of the furnace, that also shows the gates by means of which the material to be molten is introduced.

As it may be seen from FIG. 3, the furnace (1) has gates for opening/closing of the furnace (not shown in the figures) and additionally, one or more gates (8), (9) formed at least in one of the side faces of the furnace, which, preferably, have a hatch for closing and opening the gate, for avoiding thermal losses; said gates allow the entrance of the material to be laminated into the furnace chamber. In the preferred embodiment, the furnace has two side gates (8) located at the same height, and it also has a central gate (9) that will be used for manufacturing tanks of greater size. Preferably, the gates (8) and (9) are located at an intermediate height with respect to the length of the furnace chamber.

The furnace (1) has a fastening means of the molds, traditionally known as spider. In the preferred embodiment, the spider is comprised by two plates, a frontal plate (3) and a rear plate (3') (see FIGS. 1 and 2). Instead of the plates, other support unities may be used, such as, for example, frames with multiple arms. The plates (3), (3') are coupled in its center to a shaft (13) positioned at the "X" axis, as seen from FIG. 2. The plates are positioned one facing the other, in such a manner that the external faces are free to receive and hold the molds (2).

Figure 2:
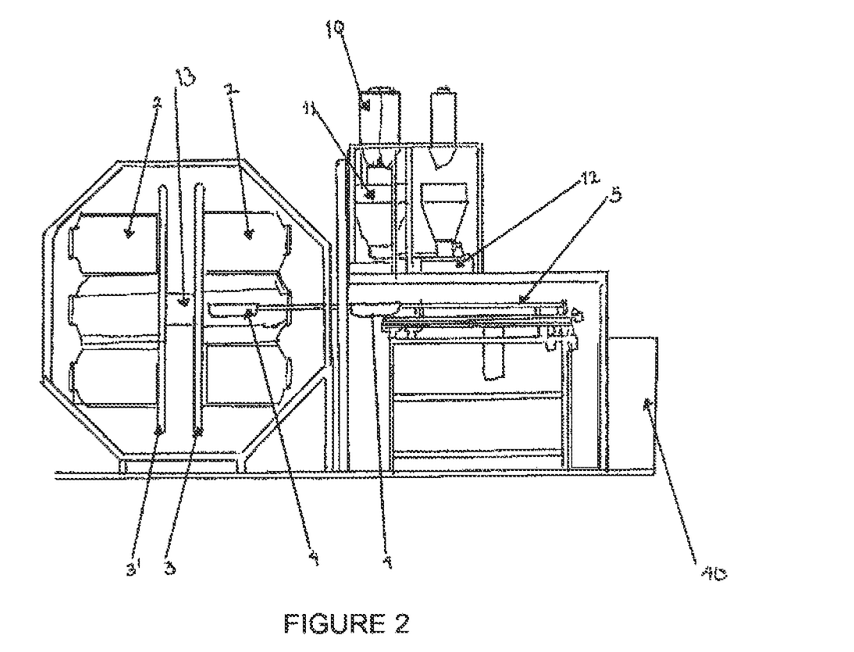
FIG. 2 is a side view of the rotomoulding apparatus of the present invention.

The rotary shaft (13) is coupled at right angles to another shaft (30) that transmits the rotary movement to the spider at the "Y" axis. The shaft (30) is shown by the dotted lines of FIG. 1. The shaft (30) allows for the spider to rotate 180° for carrying the molds (2) from the front plate (3) to the rear, and the molds (2) from the rear plate (3') to the front. With the described provision, each mold (2) is capable of receiving the material to be molten through the gates (8), (9).

In the preferred embodiment, the number of molds (2) is eight, four are positioned over a plate and the other four over the other plate. However, when it comes to small plates, the plate may support a higher number of molds. Similarly, the use of molds of larger dimensions, will involve a minor number of the same. One may even choose for one single mold in each side of the spider, depending on the manufacturing needs. In this case, the introduction of the material to be molten, may be made through the central gate (9).

The thermoplastic material introduced to the molds (2) comes from one or more feeding bins (4). Each feeding bin (4) is a tray that receives and contains the material to be molten. The bin (4) is attached on its rear edge to an arm (5) that is coupled to a gear reducer (6), this gear (6) transmits a movement of 180° rotation to the arm, so as to turn around the bin (4) and so, pour the material to be molten into the mold. Each of the arms (5) is also coupled to a second gear reducer (16) that transmits the movement of the arm (4) forward, so as to introduce the bin (4) through one of the gates (8) or (9), and backwards, so as to be aligned again with the remaining arms (4).

In the preferred embodiment, the number of bins (4) corresponds to the number of molds (2), in such a manner that each bin (4) pours its contents into a particular mold. The eight bins (4) are located at the same height and are aligned among them, as may be seen on FIG. 1. Further, the bins are grouped into two groups, each group of four, so that four bins (4) are close to a side gate (9), and the other four bins (4) are close to the other side gate (8). This arrangement allows for the introduction of a bin (4) of a first group through a gate (8), and other bin (4) of the second group through the other gate (8). Ideally, the introduction of the bins (4) is made in a simultaneous way.

The arms (5) with their respective bins (4), also have a horizontal displacement that is achieved by a third gear reducer. This displacement allows for the positioning of each one of the bins (4) at the level of the gates, so every bin may discharge their contents towards the molds as it may be required during the overall process.

As will be apparent for a skilled in the art, the movement of the bins (4) is not limited to the use of gear reducers, but also hydraulic, mechanic, pneumatic, manual, etc. means may be used.

Figure 5A:
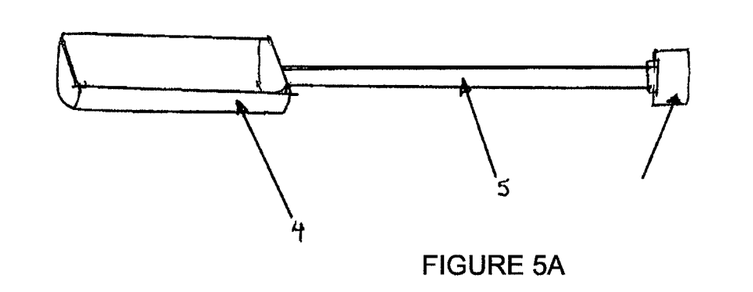
Figure 5B:
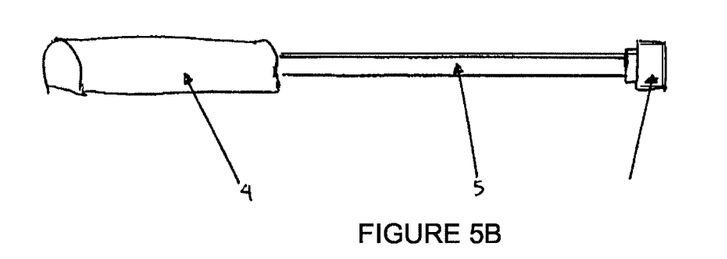

Next, the bin (4) of the present invention will be described. Preferably, each feeding bin (4) has rounded walls, as may be seen from FIGS. 5a and 5b, so as to ease the pouring of the material into the mold, and for avoiding that any waste material may be adhered to the bin (4).

The feeding bin (4) must be cooled so as to avoid particles from being adhered to the same, as the heated bin may easily allow for the adherence of the plastic material of the previous discharge. This invention provides a cooling system by means of water or another cooling liquid, wherein the cold liquid from a liquid cooling equipment, is circulated into each of the bins (4), as will be explained as follows, referring to FIGS. 6 and 7. Preferably, the cooling liquid is water, which offers the advantage of being recyclable, of low cost and high heat capacity.

Figure 6:
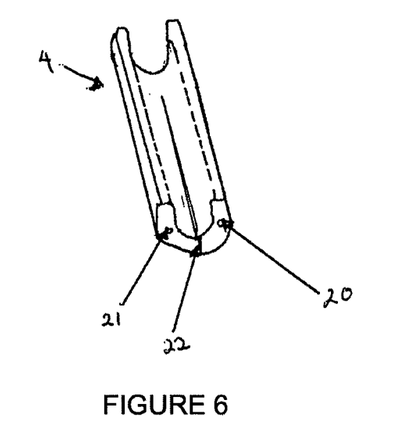
FIG. 6 is a top perspective view of one of the bins, from which the top floor has been omitted.
Figure 7:
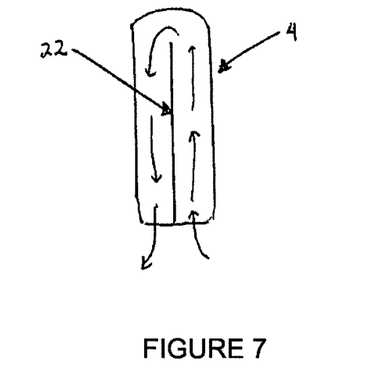
FIG. 7 is a top plant view of the bin that carries the thermoplastic material, without the top floor.

The bin (4) is a double bottom structure, in such a manner that a chamber is formed, through which, water may circulate (see FIG. 6). The bin has a cold water inlet opening (20) and a hot water outlet opening (21). The openings (20),(21), are formed preferably at one of the edges of the bin, and more preferably, at the front edge. The bin (4) has a longitudinal division (22) formed within the chamber, said division (22) is projected from the front edge of the bin (4), but is topped just before the rear edge. This division (22) allows the water that enters by the inlet opening (20) to follow a path similar to a "U" (see FIG. 7), exiting thereafter through the opening (21).

It is worth to mention that the water may be circulated from the inside of the chamber of the bin by other means, for example, with an inlet pipeline, a heating coil or any other element that allows the water flow so as to achieve cooling, nevertheless, the use of the vertical division (22) is preferred, due to its simplicity and efficacy.

Figure 8:
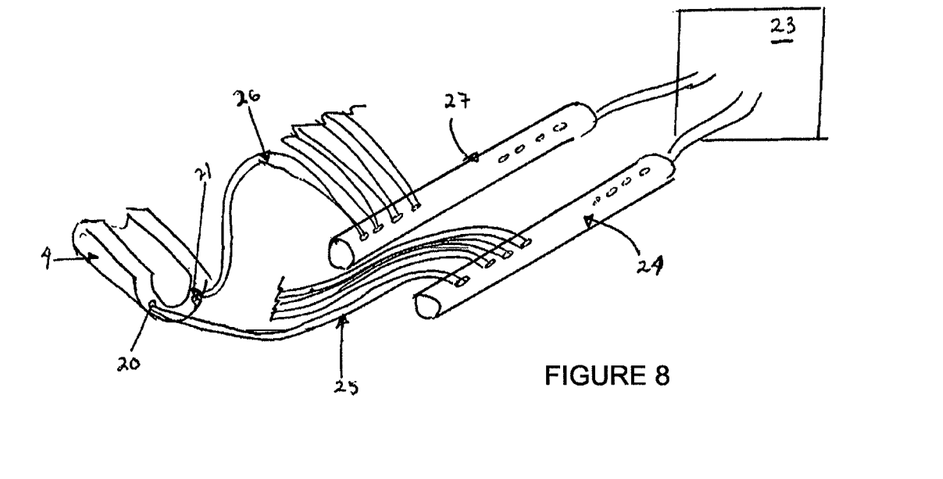
FIG. 8 is a perspective view of the cooling system of the bins.

As seen from FIG. 8, the water that enters the bins (4) comes from a cooler (23) that sends the cold water to a first cold water distributor (24), said distributor (24) has hoses (25) attached, same that carry the cold water towards the bins (4) through the inlet openings (20). The hot water exits the outlet openings (21) through the second hoses (26) that carry the water towards a second distributor (27) that returns the hot water towards the cooling equipment (23).

The hoses (25),(26) are preferably made from a heat-resistant material, as they are attached in every moment to the bins, and will also be introduced to the furnace during the discharge stage towards the molds. Likewise, the hoses (25), (26) must be made from a flexible material that allows them to couple to the rotation and the displacement of the bins (4).

Preferably, the bins are made from stainless steel covered with non-stick material or any other mold release material, chrome-plated iron, carbon steel, aluminum or any other material that is high-temperature resistant.

Figure 4:
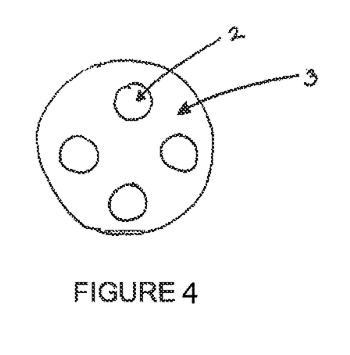
FIG. 4 is a plant view of one of the plates that support the molds.

In the preferred embodiment of this invention, considering four molds (3) in each plate (3,)(3'), the location of the molds is as shown in FIG. 4, so two of them are at the horizontal axis, and the remaining two are at the vertical axis. The spider has two positions for feeding the molds, said positions are arranged by the rotation transmitted by the shaft (13). In a first position, two molds are simultaneously fed, for example, the ones that are at the horizontal axis, by the introduction of two bins (4). Then, a rotation of 90° is performed to the plate for feeding the two remaining molds. Thereafter, the spider turns 180° by means of the shaft (30) so as to locate the molds of the rear plate (3') facing the gates. The loading operation is repeated as it was made with the first plate (3), for the remaining molds. The procedure is repeated for layering each one of the layers that the product may require.

An important advantage of the present invention is that, when the bin (4) is cold, there is no waste material adherence to the walls of the bins, avoiding the pollution of the subsequent layers. However, a compressed air cleansing system is also necessary for removing the particles of the previous discharge, and the bin is ready for another load. The compressed air is applied to the bins when they are removed from the furnace. The cleansing system of the bins is located, preferably, at the base of the feeding system, beneath the bins. It comprises a venturi system, preferably a fan-like system, so as to encompass the greater part of the bin. Rather, any device with air movement may be used. When the cleansing of the bins is desired, same are turned downwards so that they may receive the compressed air. In a preferred manner, the waste of the bins is received in a container.

The weighing and dosage system of the thermoplastic material that is proposed for the preferred embodiment, is already known. It comprises one or more hoover(s) (10), each hoover (10) been attached to a hopper (11) and to a gravimetric balance (12), which has electronic level indicators. The discharge towards the bins (4) is made by means of an opening system. The hoover (10) absorbs the plastic material from a silo and transfers it to the hopper (11). The gravimetric balance (12) sends a signal by electronic means to the hopper (11) for stopping the feeding according to the weight for which the balance is programmed.

In the preferred embodiment, in order to manufacture a three layer product, three hoppers, three hoovers and three balances will be used. The system is arranged so that, during the manufacturing of the first layer, one single balance (12) feeds all the bins of the first material to be used. For the second layer, the second hopper will be used, and so on.

Alternatively, the feeding to the bins may be made in a natural way, by pneumatic or hydraulic means, among others.

The system of this invention has a furnace control panel (40) and a feeding control panel (41), both being computerized systems. The control panel works by coordinates. Both, the feeding system and the furnace control, are synchronized for feeding the material.

The system of this invention, has also a support device for the feeders and a support for the arms and the bins.

As it will become apparent to a person with average skill in the art, multiple modifications are possible for the system described in this application. For example, the movement of the molds within the furnace, may be performed in different manners, for example, in a roundabout manner.

The process of the preferred embodiment of the present invention, comprises the following basic stages:

1. Load the hoppers (11) and the gravimetric balances (12) with the programmed amount of material to be molten.
2. Load the bins (4) with the material from one of the hoppers (11).
3. Place the molds (2) of one of the plates (3) facing the gates.
4. Open the gates (8).
5. Carry a bin of the first group of bins towards the furnace through a gate (8), and simultaneously carry another bin of the second group of bins through another gate (8).
6. Simultaneously rotate the two bins (4) for pouring their contents towards the molds (2) adjacent to the gates (8).
7. Rotate the front plate (3) at the "X" axis for locating the two empty molds (2) facing the gates (8).
8. Repeat steps 5 and 6 with the empty molds of the plate (3).
9. Rotate the plates (3) and (3') at the "Y" axis by means of the shaft (30) for locating the rear plate (3') facing the gates (8).
10. Repeat steps 3 through 8 for loading the molds (2) of the rear plate (3').
11. Perform the rotation of the molds within the molding chamber until the layering of the first layer is made.
12. Repeat steps 2 through 11 for the subsequent layering of the other thermoplastic material layers.
13. Open the furnace for removing the molds and unmold the finished pieces.

It should be added that the cleansing stage of the bins (4) with compressed air, may be performed whether at the moment that the bins are removed from the oven, or just before placing the material coming from the hopper.

As one may ascertain from the above specification, the manufacturing cycle of the plastic articles, is totally automated. Another advantage of the procedure herein disclosed, is its great versatility, as articles of different shapes and sizes, and even of different thickness, may be obtained simultaneously and with the same machine.

The resulting product of this process has all the advantages of the articles rotomoulded in furnace, as the homogeneity of the thickness of the walls is maintained, achieving high quality products. The resulting product has improved attributes and lower manufacturing costs.

Another advantage is the low energy cost as compared with the processes that require the extraction of the molds from the oven for a new load, or other processes wherein the furnace is opened for manually introducing the load of the material to be molten, as each opening of the furnace implies heat energy losses. As a consequence, the process is also cheaper and environmentally friendly.

With the apparatus and method herein disclosed, it is possible to save up to 50% of the time that would be required if it were to be made in a traditional way. The synchronization of the furnace and the feeding in an automated manner by means of coordinates, results in such a time saving that the manufacturing time may be reduced.

In the preferred embodiment, the resulting product of the process is a three layered tank, wherein the outer layer is a polyethylene based solid material, the intermediate layer is a polyethylene based blowing agent and the inner layer is a polyethylene based antibacterial material.

It is apparent that modifications to the components of the apparatus described in this application may be made, for example, the use of a higher number of gates for performing a simultaneous feeding of all the molds within the furnace, however, the system becomes more complex. On the contrary, the use of a coordinates system allows performing multiple feeding of the molds with only two gates, without the need to open the principal gate. Further, the fact of using an intermediate gate for larger sized molds, is also an evidence of the versatility of the apparatus herein disclosed.

The invention claimed is:

1. A rotomoulding apparatus comprising:
   a furnace delimited by walls and having a molding chamber therein; and
   a system for feeding a thermoplastic material into the furnace,
   wherein the furnace comprises:
   (i) means for holding molds;
   (ii) a plurality of molds attached to said means for holding molds within which the thermoplastic material is provided;
   (iii) heating means; and
   (iv) means that transmits rotational movement to the molds, and
   wherein:
   a) the apparatus further comprises a cooling system formed by a liquid cooling equipment that is coupled to a liquid distribution means,
   b) the furnace has one or more gates formed on one of its walls, each of the gates designed for allowing introduction of at least one bin towards the furnace, the at least one bin being a structure for carrying the thermoplastic material from a position located out of the furnace and adjacent the gates to a position inside one of the molds positioned inside the furnace, each bin being attached to an arm that has (i) means for moving the bin forward and backward in order to introduce it and remove it through one of the gates; and (ii) means for rotating the arm in order to turn around the bin and pour its contents into the molds within the furnace, and
   c) each bin comprises a double bottom structure, in such a manner that among its two walls, a chamber is formed, through which a liquid that comes from the cooling equipment is circulated; each bin has two openings, an inlet and an outlet, the liquid enters through the inlet opening, circulates through the chamber of the bin, and exits through the outlet opening.

2. The rotomoulding apparatus according to claim 1, wherein each bin has rounded walls.

3. The rotomoulding apparatus according to claim 1, wherein weighing and dosing of the thermoplastic material is made by a gravimetric balance.

4. The rotomoulding apparatus according to claim 1, wherein the arm of each bin is rotated by action of a gear reducer.

5. The rotomoulding apparatus according to claim 1, wherein each bin has a longitudinal division that allows for the liquid that enters by the inlet opening to follow a path similar to a "U".

6. The rotomoulding apparatus according to claim 1, wherein each gate has opening and closing means.

7. The rotomoulding apparatus according to claim 1, wherein the means for rotating the arm is configured to perform a 180° rotation.

8. The rotomoulding apparatus according to claim 1, wherein each bin has a longitudinal division that allows for the liquid to follow a path in the form of a "U".

9. The rotomoulding apparatus according to claim 1, wherein the means for moving the bin forward and backward comprises one or more gear reducers.

10. The rotomoulding apparatus according to claim 1, wherein the number of gates is two.

11. The rotomoulding apparatus according to claim 1, wherein the number of gates is three.

12. The rotomoulding apparatus according to claim 1, wherein the gates comprise a central gate for manufacturing greater sized tanks.

13. The rotomoulding apparatus according to claim 1, wherein the gates are located at a same height.

14. The rotomoulding apparatus according to claim 1, wherein the gates are located at an intermediate height with respect to a length of the molding chamber of the furnace.

15. The rotomoulding apparatus according to claim 1, wherein each bin is controlled using a computerized control panel.

16. The rotomoulding apparatus according to claim 1, wherein the apparatus has a support device for each arm and each bin.

17. The rotomoulding apparatus according to claim 1, further comprising means for cleansing each bin.

18. The rotomoulding apparatus according to claim 17, wherein the means for cleansing comprises one or more means for sending compressed air.

19. The rotomoulding apparatus according to claim 1, wherein the cooling system is configured to cool by means of water or other cooling liquid.

20. The rotomoulding apparatus according to claim 1, wherein the liquid distribution means comprises:
   a first distributor that transfers the liquid that comes from the cooling equipment to one or more first hoses designed for circulating the liquid; and
   a second distributor that receives hot liquid coming from the bins through one or more second hoses, and returns the hot liquid back to the cooling equipment.

21. A method for manufacturing plastic articles using a rotomoulding apparatus, the method comprising:
   a) loading hoppers and gravimetric balances with a programmed amount of thermoplastic material to be molten;
   b) loading bins from a first group of bins or a second group of bins with the thermoplastic material from one of the hoppers;
   c) placing molds which are attached to a front or a rear plate adjacent to gates of a furnace of the rotomolding apparatus,
      wherein the rotomoulding apparatus comprises: the furnace delimited by walls and having a molding chamber therein; and a system for feeding the thermoplastic material into the furnace, wherein the furnace comprises (i) means for holding molds; (ii) a plurality of molds attached to said means for holding molds within which the thermoplastic material is provided; (iii) heating means; and (iv) means that transmits rotational movement to the molds, and wherein a) the apparatus further comprises a cooling system formed by a liquid cooling equipment that is coupled to a liquid distribution means, b) the furnace has one or more gates formed on one of its walls, each of the gates designed for allowing introduction of the at least one bin towards the furnace, the at least one bin being a structure for carrying the thermoplastic material from a position located outside of the furnace and adjacent the gates to a position inside one of the molds positioned inside the furnace, each bin being attached to an arm that has (i) means for moving the bin forward and backward in order to introduce it and remove it through one of the gates; and (ii) means for rotating the arm in order to turn around the bin and pour its contents into the molds within the furnace, and c) each bin comprises a double bottom structure, in such a manner that among its two walls, a chamber is formed, through which liquid that comes from the cooling equipment is circulated; each bin has two openings, an inlet and an outlet, the liquid enters the through the inlet opening, circulates through the chamber of the bin, and exits through the outlet opening;
   d) opening the gates;
   e) carrying a bin of the first group of the bins toward the furnace through one of the gates, and simultaneously carrying another bin of the second group of the bins through another one of the gates;
   f) simultaneously rotating the bin and the another bin for pouring their contents into the molds adjacent to the gates;
   g) rotating a front plate at an "X: axis for locating two empty molds adjacent to the gates;
   h) repeating the steps e) and f) with empty molds of the front plate;
   i) rotating the plates at a "Y" axis by means of a shaft for locating a rear plate adjacent to the gates;
   j) repeating steps c) through h) for loading the molds of the rear plate;
   k) rotating the molds within the chamber until layering of a first layer is made;
   l) repeating steps b) through k) for subsequent layering of other thermoplastic material layers; and
   m) opening the furnace for removing the molds and unmolding finished pieces.

22. The method for manufacturing plastic articles of claim 21, wherein the method further comprises performing cleansing of the bins with compressed air at a moment when the bins are removed from the furnace, or just before placing the thermoplastic material coming from the one of the hoppers.

23. The method for manufacturing plastic articles of claim 21, wherein the method is performed automatically.

24. The method for manufacturing plastic articles of claim 21, wherein the method is performed using a computerized control panel.

* * * * *